United States Patent
Au et al.

(10) Patent No.: US 10,128,993 B2
(45) Date of Patent: Nov. 13, 2018

(54) SYSTEMS AND METHODS OF ADAPTIVE FRAME STRUCTURE FOR TIME DIVISION DUPLEX

(71) Applicant: Huawei Technologies Co., Ltd., Shenzhen (CN)

(72) Inventors: Kelvin Kar Kin Au, Kanata (CA); Jianglei Ma, Ottawa (CA); Liqing Zhang, Ottawa (CA); Jing Qiu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 24 days.

(21) Appl. No.: 15/078,621

(22) Filed: Mar. 23, 2016

(65) Prior Publication Data

US 2016/0353436 A1 Dec. 1, 2016

Related U.S. Application Data

(60) Provisional application No. 62/168,616, filed on May 29, 2015.

(51) Int. Cl.
*H04L 5/00* (2006.01)
*H04L 5/14* (2006.01)
*H04L 27/26* (2006.01)

(52) U.S. Cl.
CPC .......... *H04L 5/0007* (2013.01); *H04L 5/0042* (2013.01); *H04L 5/1469* (2013.01); *H04L 27/2602* (2013.01); *H04L 5/0055* (2013.01)

(58) Field of Classification Search
None
See application file for complete search history.

(56) References Cited

U.S. PATENT DOCUMENTS

| | | | |
|---|---|---|---|
| 8,400,952 B2* | 3/2013 | Lim ...................... | H04L 5/1469 370/208 |
| 8,472,358 B2* | 6/2013 | Torsner ................. | H04L 1/1621 370/229 |
| 2008/0028270 A1 | 1/2008 | Parkvall et al. | |
| 2009/0092090 A1* | 4/2009 | Beems Hart .......... | H04L 5/0037 370/329 |

(Continued)

FOREIGN PATENT DOCUMENTS

| | | |
|---|---|---|
| RU | 2468539 C2 | 11/2012 |
| WO | 2014052645 A1 | 4/2014 |

OTHER PUBLICATIONS

Levanen et al.,:"Dense small-cell networks:Rethinking the radio interface beyond LTE-advanced",1st International Conference on 5G for Ubiquitous Connectivity, ICST, Nov. 26, 2014, total 7 pages.

*Primary Examiner* — Eunsook Choi
(74) *Attorney, Agent, or Firm* — Slater Matsil, LLP

(57) ABSTRACT

A time division duplex (TDD) transmission time interval (TTI) communicating transmissions in a first direction may include one or more regions for communicating in a second direction, where the first direction is a transmit direction and the second direction is a receive direction, or vice versa. A radio frame may include TDD TTIs with such regions and/or TDD TTIs without such regions for wireless communication, and these TDD TTIs may further be configured in accordance with different frame structure configurations, such as different TTI lengths, subcarrier spacings or symbol durations.

19 Claims, 11 Drawing Sheets

(56) References Cited

U.S. PATENT DOCUMENTS

| | | |
|---|---|---|
| 2009/0180435 A1 | 7/2009 | Sarkar |
| 2011/0103406 A1* | 5/2011 | Cai ................... H04L 5/0044 370/480 |
| 2012/0320806 A1 | 12/2012 | Ji et al. |
| 2015/0036557 A1 | 2/2015 | Zhang et al. |
| 2015/0103702 A1* | 4/2015 | Lahetkangas ......... H04L 5/0044 370/280 |
| 2016/0227424 A1* | 8/2016 | Chen .................... H04W 24/08 |
| 2016/0227496 A1* | 8/2016 | Panteleev ............. H04W 76/18 |
| 2016/0249329 A1 | 8/2016 | Au et al. |
| 2016/0270060 A1* | 9/2016 | Kusashima ........... H04L 1/1854 |
| 2016/0294521 A1 | 10/2016 | Au et al. |
| 2018/0020462 A1* | 1/2018 | Xiong ............... H04W 72/1215 |

\* cited by examiner

700

FRAME STRUCTURE CONFIGURATION 1

| TYPE | CONFIGURATION |
|---|---|
| 0 | NORMAL |
| 1 | ONE A/N |
| 2 | ONE DATA |
| 3 | ONE (DATA+A/N) |

710

FRAME STRUCTURE CONFIGURATION 2

| TYPE | CONFIGURATION |
|---|---|
| 0 | NORMAL |
| 1 | ONE A/N |
| 2 | ONE DATA |
| 3 | ONE (DATA+A/N) |
| 4 | TWO A/N |
| 5 | TWO DATA |
| 6 | TWO (DATA+A/N) |

720

FRAME STRUCTURE CONFIGURATION 3

| TYPE | CONFIGURATION |
|---|---|
| 0 | NORMAL |
| 1 | ONE (DATA+A/N) |
| 2 | TWO (DATA+A/N) |

| TYPE | CONFIGURATION | FS CONFIGURATION 1 | FS CONFIGURATION 2 | FS CONFIGURATION 3 |
|---|---|---|---|---|
| 0 | NORMAL | ✓ | ✓ | ✓ |
| 1 | ONE A/N | ✓ | ✓ | N/A |
| 2 | ONE DATA | ✓ | ✓ | N/A |
| 3 | ONE (DATA+A/N) | ✓ | ✓ | ✓ |
| 4 | TWO A/N | N/A | ✓ | N/A |
| 5 | TWO DATA | N/A | ✓ | N/A |
| 6 | TWO (DATA+A/N) | N/A | ✓ | ✓ |

FIG. 8

SYSTEMS AND METHODS OF ADAPTIVE FRAME STRUCTURE FOR TIME DIVISION DUPLEX

This patent application claims priority to U.S. Provisional Application No. 62/168,616, filed on May 29, 2015 and entitled "System and Methods of Adaptive Frame Structure for Time Division Duplex", which is hereby incorporated by reference herein as if reproduced in its entirety.

TECHNICAL FIELD

The present application relates to wireless communications, and specifically, methods and systems of adaptive frame structure for time division duplex.

BACKGROUND

In a wireless communications system, transmissions are generally communicated in accordance with pre-defined fixed frame structures. Fixed frame structures are used so that communicating devices have knowledge of resources, such as time, frequency, or time and frequency resources; and interferences between different resources and between transmitting and receiving of signals may be avoided or reduced. Modern wireless networks are increasingly used to support communications of diverse traffic types. Different traffic types may have different characteristics and quality of service (QoS) requirements, such as latency, which fixed frame structures may be unable to accommodate. Accordingly, adaptive frame structures capable of efficiently supporting different traffic types are desired.

SUMMARY OF THE INVENTION

Technical advantages are generally achieved, by embodiments of this disclosure which describe system and methods of adaptive frame structure for time division duplex.

In accordance with an embodiment, a method for wireless communications is provided. The method includes communicating, by a device, a first data transmission in a first time division duplexing (TDD) transmission time interval (TTI) in a first direction. The first TDD TTI is configured with a first frame structure configuration. The method further includes communicating, by the device, a second data transmission in the first TDD TTI in a second direction. One of the first direction and the second direction is a transmit direction, and the other of the first direction and the second direction is a receive direction.

In accordance with another embodiment, a method for wireless communications is also provided. The method includes assigning, by a network controller, a frame structure configuration for communicating in a time division duplexing (TDD) transmission time interval (TTI) in a first direction over a frequency sub-band. The frame structure configuration corresponds to a set of frame parameters. The method further includes selecting, by the network controller, a switching type for the TDD TTI. The switching type indicates whether or not the TDD TTI includes at least one transmission opportunity for communicating in a second direction. One of the first direction and the second direction is a transmit direction, and the other of the first direction and the second direction is a receive direction. The method also includes sending an indication indicating communication of orthogonal frequency division multiplexing (OFDM) signals in the TDD TTI in accordance with the set of frame parameters and the selected switching type.

BRIEF DESCRIPTION OF THE DRAWINGS

For a more complete understanding of the present disclosure, and the advantages thereof, reference is now made to the following description taken in conjunction with the accompanying drawings, in which:

FIG. 7 is tables for representing different frame structure configurations and switching types;

FIG. 8 is another table for representing different frame structure configurations and switching types;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
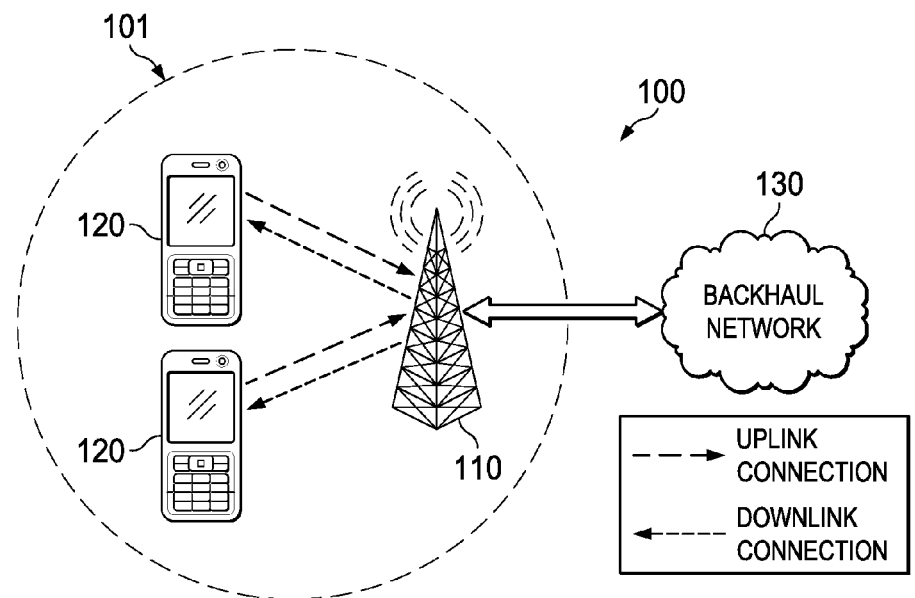
FIG. 1 is a block diagram of an embodiment wireless communications network.

The making and using of embodiments are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of the appended claims.

Embodiments described herein communicate data transmissions in opposite directions in the same time division duplex (TDD) transmission time interval (TTI). In one example, a downlink TDD TTI includes a region for uplink transmissions. In another example, an uplink TDD TTI includes a region for downlink transmissions. Regions in a TDD TTI that carry transmissions in an opposite direction than that of the TDD TTI are herein referred to as opposite regions. An opposite region in a TDD TTI may carry data (i.e., an opposite data region) and/or feedback information (i.e., an opposite feedback region), such as a Hybrid Automatic Repeat reQuest (HARD) acknowledgement (ACK)/negative acknowledgement (NACK) message. In one example, a TDD TTI may include one opposite region for carrying data, and another opposite region for carrying feedback information. In such an example, the opposite regions may span different time-domain resources or different frequency-domain resources.

Embodiments of the present disclosure also provide systems and methods for communicating orthogonal frequency-division multiplexing (OFDM) signals in a TDD frame having TDD TTIs configured with different frame structure configurations and TTI switching types. As used herein, a TDD frame refers to a frame that carries signals in TDD TTIs. The different frame structure configurations may utilize different sets of frame parameters including a sub-carrier (SC) spacing, a TTI length, a cyclic prefix (CP) length, and a symbol duration. Different TTI switching types indicate different configurations of opposite data regions and opposite feedback regions included in TDD TTIs. In one embodiment, TDD TTIs in the TDD frame over different OFDM frequency sub-bands have different TTI lengths and/or different subcarrier spacings. In another embodiment, TDD TTIs in the TDD frame over the same OFDM frequency sub-band have different TTI lengths and/or different subcarrier spacings. In yet another embodiment, TDD TTIs in the TDD frame over different OFDM frequency sub-bands are configured to have different TTI switching types. In yet another embodiment, TDD TTIs in a frame over the same OFDM frequency sub-band are configured to have different TTI switching types. In yet another embodiment, a TDD TTI in the TDD frame includes zero, one, or more opposite regions. Guard periods (GPs) are included in a TDD frame to separate downlink and uplink transmissions and are aligned in the time domain across frequency sub-bands. Configuration information of a TDD TTI, such as frame structure configuration, TTI switching type, and frequency sub-band of the TDD TTI, may be pre-defined, defined dynamically or semi-statically, and signaled to UEs. The signaling may be transmitted through broadcast, multicast or unicast dynamically, semi-statically or statically.

FIG. 1 is a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Transmissions between a base station and a mobile device are generally communicated in transmission time intervals (TTIs) (or "subframes") in accordance with pre-defined frame structure configurations. As used herein, "communicating a transmission" refers to transmitting or receiving the transmission. The transmissions may include data, control information, and/or feedback information, such as Hybrid Automatic Repeat reQuest (HARQ) acknowledgement (ACK)/negative acknowledgement (NACK) messages. A frame structure configuration generally specifies a combination of frame parameters, such as sub-carrier (SC) spacing, TTI length, cyclic prefix (CP) length, and symbol duration. The lengths of TTIs affect latency performance and throughput performance of a network. Specifically, shorter TTIs achieve superior latency performance by providing more frequent transmission opportunities, and longer TTIs achieve superior throughput performance by reducing signaling overhead.

Generally, a TTI is designated for transmissions in either an uplink direction or a downlink direction, which may be referred to as transmission direction of the TTI, and thus a TTI may be referred to as an uplink TTI or a downlink TTI. In some embodiments, a TTI may be configured to include a region for transmissions in a direction opposite to the TTI's transmission direction. For example, a downlink TTI contains a region for an uplink transmission, or an uplink TTI contains a region for a downlink transmission.

Figure 2:
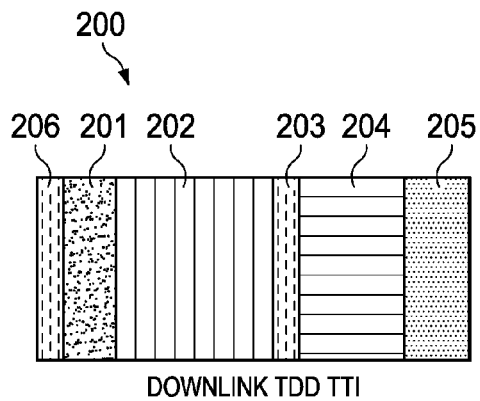
FIG. 2 is a diagram of an embodiment downlink TDD TTI.

FIG. 2 is an embodiment downlink TTI 200 in a time division duplex (TDD) communications network. The TDD TTI 200 includes regions for uplink transmissions. As shown, the downlink TDD TTI 200 includes regions 201-206 divided in the time domain. The region 201 is allocated for downlink control channels, which may be used, for example, to send scheduling information for uplink data transmissions. The region 202 is for downlink data transmissions, which may be scheduled or grant-free transmissions. The region 204 is allocated for an uplink data transmission, and the region 205 is for transmission of uplink feedback information, such as an uplink ACK/NACK message acknowledging receipt of a previous downlink data transmission. For example, the uplink ACK/NACK message is communicated to acknowledge receipt of a downlink data transmission communicated in a previous downlink TDD TTI or in the region 202 of the downlink TDD TTI 200. As used herein, the region 204 is referred to as an opposite data region of TDD TTI 200, and the region 205 is referred to as an opposite feedback region of TDD TTI 200.

In the example shown in FIG. 2, the region 204 and the region 205 are divided in the time domain, i.e., the uplink data transmission in the region 204 and the uplink ACK/NACK message in the region 205 are communicated in a time division multiplexed fashion. The regions 204 and 205 may be viewed as uplink transmission opportunities (TOs) for uplink transmissions of, e.g., low latency uplink traffic or ACK/NACK messages, and may contain one or more orthogonal frequency division multiplexing (OFDM) symbols or slots. Data transmissions in the region 204 may be scheduled or grant-free to provide additional flexibility for data transmissions for different applications and devices. For example, a mobile device may transmit data in the region 204 after receiving a grant from a base station. In another example, multiple mobile devices may contend for the region 204 using a contention-based scheme that is applicable. Grant-free data transmissions may be beneficial for supporting communications for particular devices or applications in a wireless network, such as, but not limited to, machine type communication (MTC). MTC may occur as part of the "Internet of things", where a low data rate may be acceptable or mandated by the use of less complex or costly data transmitters, receivers and power sources. Where a communication from a machine to a network includes a status update, sensor reading, alarm or the like, the requirement for a high data rate is less likely. Such transmissions may include large numbers of communications of relatively small packet size and require a relatively low data rate. Similar characteristics may occur for downlink transmissions from the network to the device or machine. Scheduling these types of transmissions may be inefficient due to signaling overhead incurred for small packet transmissions, the latency of a scheduling request and grant procedure, and the power consumption incurred by a transmitting device or access point to handle this overhead and delay. The region 203 is a guard period (GP) separating the downlink transmissions in the regions 201-202 and the uplink transmissions in the regions 204-205. The GP 203 can help reduce interference when switching between uplink and downlink transmissions in the TDD network. The region 206 is a guard period, which separates downlink transmissions in the regions 201-202 from the preceding uplink transmissions. It should be understood that no guard period is required before a downlink transmission that is not preceded by an uplink transmission.

Figure 3:
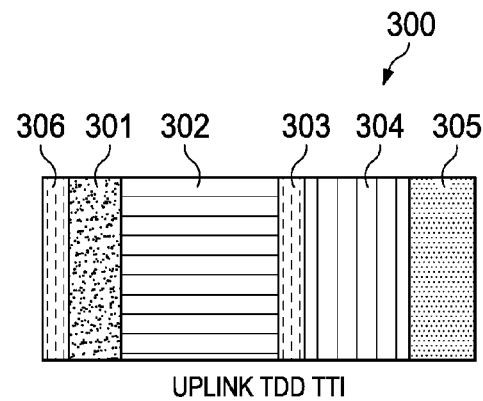
FIG. 3 is a diagram of an embodiment uplink TDD TTI.

FIG. 3 is an embodiment uplink TTI 300 in a TDD communications network. The uplink TTI 300 includes regions for downlink transmissions. As shown, the uplink TTI 300 includes a region 301 for uplink control channels, a region 302 for uplink data transmissions, a region 303 as a guard period, a region 304 for downlink data transmissions, a region 305 for transmission of a downlink ACK/NACK message acknowledging receipt of a previous uplink data transmission, and a region 306 as another guard period. Similar to the downlink TDD TTI 200 in FIG. 2, the regions 301-305 are divided in the time domain.

Figure 4:
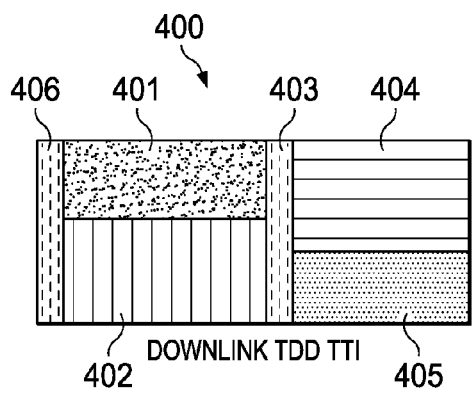
FIG. 4 is a diagram of another embodiment downlink TDD TTI.

FIG. 4 is another embodiment downlink TTI 400 in a TDD communications network. As shown, the downlink TTI 400 includes a region 401 for downlink control channels, a region 402 for downlink data transmissions, a region 403 as a guard period, a region 404 for uplink data transmissions, and a region 405 for transmission of uplink feedback information, such as an uplink ACK/NACK message. In this example, the region 401 and the region 402 are divided in the frequency domain, i.e., the control signals in the region 401 and data signals in the region 402 are transmitted during a same time period within the downlink TTI 400 but over different frequency resources assigned to the downlink TTI 400. For example, when the downlink TTI 400 is used to transmit signals over a frequency sub-band divided into multiple sub-carriers for transmissions, the control signals may be transmitted over a first sub-carrier of the frequency sub-band, and the data signals may be transmitted over the other sub-carriers of the frequency sub-band. Similarly, the region 404 and region 405 are also divided in the frequency domain, which indicates that the uplink data transmissions and the uplink ACK/NACK message are transmitted during a same time period within the downlink TTI 400 but over different frequency resources assigned to the downlink TTI 400. Division of the regions 401 and 402 in the frequency domain may be different from that of the regions 404 and 405. For example, the downlink data transmissions in the region 402 and the uplink data transmissions in the region 404 are communicated over different frequency resources. The region 406 is a guard period separating downlink transmissions in the regions 401-402 from a preceding uplink transmission.

Figure 5:
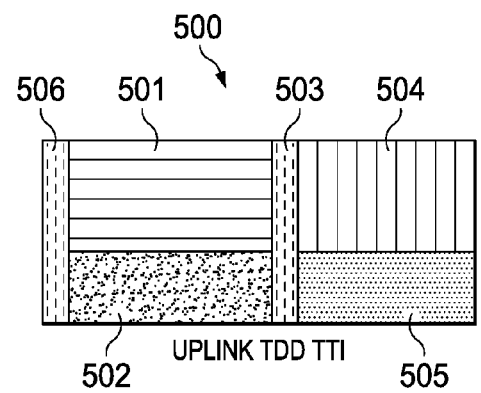
FIG. 5 is a diagram of another embodiment uplink TDD TTI.

FIG. 5 is another embodiment uplink TTI 500 in a TDD communications network. As shown, the uplink TTI 500 includes a region 501 for uplink control channels, a region 502 for uplink data transmissions, a region 503 as a guard period, a region 504 for downlink data transmissions, and a region 505 for transmission of a downlink ACK/NACK message. Similar to the downlink TTI 400 in FIG. 4, the regions 501 and 502 are divided in the frequency domain, and the regions 504 and 505 are divided in the frequency domain. Region 506 is a guard period separating uplink transmissions in the regions 501-502 from a preceding downlink transmission.

As used herein, the regions 204, 304, 404 and 504 are referred to as opposite data regions in a TDD TTI, and the regions 205, 305, 405 and 505 are referred to as opposite feedback regions (or opposite ACK/NACK regions) in a TDD TTI, because transmissions in these regions are in a direction opposite to the transmission direction of the TDD TTI. These regions are also generally referred to as opposite regions in a TDD TTI. The TDD TTIs with TTI structures as illustrated in FIGS. 2-5 are merely for illustrative purposes, and should not be interpreted to be limiting to the scope of the claims. One of ordinary skill in the art would recognize that there are many different mechanisms or schemes to implement data and/or feedback information communication in a TDD TTI and opposite regions in the TDD TTI.

In some embodiments, transmissions in one or more opposite regions of a TDD TTI are configurable. In one embodiment, a TDD TTI of one transmission direction, i.e., downlink or uplink, may include different configurations of an opposite data region and an opposite feedback region, both of which are used for transmissions in an opposite direction of the TDD TTI, i.e., uplink or downlink. In one embodiment, a downlink TDD TTI may not contain any opposite data region or opposite feedback region. In another embodiment, the downlink TDD TTI may contain more than one opposite data region or opposite feedback region. In yet another embodiment, TDD TTIs include opposite regions at different locations and with different lengths. The number, lengths and locations of the opposite regions may vary depending on factors such as traffic types, traffic latency requirements, traffic sizes, network load, as well as frame structure configurations. The different configurations of an opposite data region and an opposite feedback region in a TDD TTI herein are referred to as TTI switching types (or switching types), because including these opposite regions in the TDD TTI requires a transceiver to switch between a transmitting mode and a receiving mode. Each switching type is characterized by its configuration information, which may include the number of opposite data regions, the number of opposite feedback regions, location and duration of each of these opposite regions, and frequency resources for transmissions in these opposite regions. A switching type may indicate there is zero, one or more opposite regions in a TDD TTI.

In some embodiments, a switching type of a TDD TTI is pre-defined or defined when needed, and configuration information about the switching type for the TDD TTI is signaled for communication. The signaling may be transmitted in a control channel via broadcast, multi-cast, or unicast. For example, when there is no data for traffic types which require a consistent low latency feedback, UEs may be signaled to disable opposite feedback regions in TDD TTIs. In another example, a base station is aware of a need for one or more opposite regions in a TDD TTI, determines a switching type for the TDD TTI, and transmits such configuration information of the TDD TTI to a UE. In yet another example, a switching type may also be determined for a TDD TTI in response to a request from a UE. In another embodiment, each switching type corresponding to a frame structure configuration is pre-defined, indexed, and made known to all UEs. In this example, an index corresponding to a switching type configured for a TDD TTI may be transmitted, by which a UE identifies the switching type it may use. One of ordinary skill in the art would recognize many variations and alternatives for signaling configuration information of TDD TTIs regarding switching types.

Figure 6:
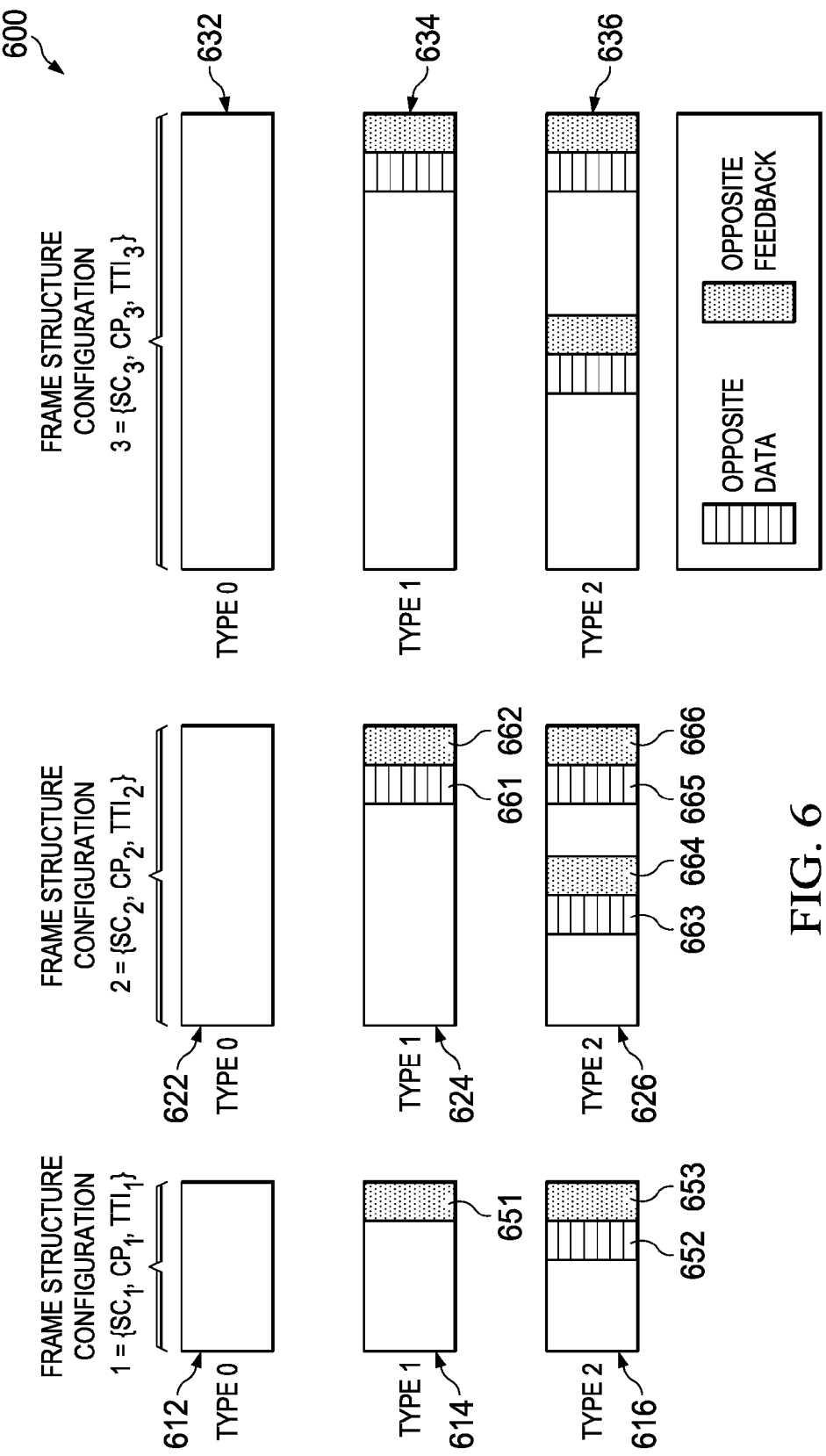
FIG. 6 is a diagram of embodiment TDD TTIs with different frame structure configurations and switching types.

As mentioned above, different frame structure configurations correspond to different combinations of frame parameters. Using different frame structure configurations to communicate traffic may provide significant spectrum flexibility, because using different combinations of SC spacings, TTI lengths, CP lengths, and symbol durations may realize performance advantages in, e.g., latency and spectral efficiency. A frame structure configuration corresponding to a set of frame parameters may be assigned to a TDD TTI in accordance with traffic types, number of UEs being served by a base station, latency requirements, or a specific request from a UE. A switching type may also be selected for the TDD TTI in accordance with the assigned frame structure configuration, a latency requirement, or a UE's request. FIG. 6 is a diagram of embodiment TTD TTIs 600 configured to have different frame structure configurations and switching types for wireless communications. In this example, each frame structure configuration corresponds to a different set of SC spacing, CP length and TTI length. As shown, frame structure configuration 1 is assigned to TDD TTIs 612, 614 and 616; frame structure configuration 2 is assigned to TDD TTIs 622, 624 and 626; and frame structure configuration 3 is assigned to TDD TTIs 632, 634 and 636.

In some embodiments, each TDD TTI has a switching type corresponding to its assigned frame structure configuration. As described above, a switching type indicates a configuration of an opposite data region and an opposite feedback region in a TTI for transmitting data and ACK/NACK messages in an opposite direction of the TTI's transmission direction. Different switching types may be defined corresponding to different frame structure configurations. In this example as illustrated in FIG. 6, each of the three frame structure configurations corresponds to three switching types, namely, Type 0, Type 1 and Type 2. In each of the three frame structure configurations, there is no opposite region within a TDD TTI of Type 0. Type 1 and Type 2 indicate different combinations of opposite data and feedback regions. As shown, TDD TTI 612 is a Type 0 TTI. TDD TTI 614 is a Type 1 TTI, and includes an opposite feedback region 651 at the end of the TTI. TDD TTI 616 is a Type 2 TTI corresponding to the frame structure configuration 1, and includes an opposite data region 652 and an opposite feedback region 653 at the end. The two opposite regions 652 and 653 are adjacent to each other in the time domain, and are herein referred to as a pair of opposite regions. A TDD TTI of this type, e.g., TDD TTI 616, may be considered to be self-contained because downlink and uplink data, control and feedback information exist in this TTI.

FIG. 6 also shows that TDD TTI 622 is also a Type 0 TTI. TDD TTI 624 is a Type 1 TTI including an opposite data region 661 and an opposite feedback region 662 at the end. TDD TTI 626 is a Type 2 TTI corresponding to the frame structure configuration 2, and includes two pairs of opposite regions. As shown, one pair of opposite regions 663 and 664 is included in the middle of the TDD TTI 626, and another pair of opposite regions 665 and 666 is included at the end of the TDD TTI 626. TDD TTI 632 is a Type 0 TTI. TDD TTI 634 is a Type 1 TTI corresponding to the frame structure configuration 3, and TDD TTI 636 is a Type 2 TTI corresponding to the frame structure configuration 3. FIG. 6 illustrates that adjacent opposite data region and opposite feedback region are arranged in a time multiplexed fashion, these regions may also be in a frequency multiplexed fashion.

In some embodiments, different frame structure configurations may have different sets of switching types defined. For example, long TTIs, e.g. TTIs of 1 ms or 5 ms, may have more switching types defined than those with short TTI lengths, e.g. 0.1 ms or 0.125 ms, to provide more options for data and feedback information transmissions in an opposite direction. In some embodiments, locations of opposite regions for different switching types may be pre-defined. For example, for switching types with one opposite region, the opposite region may be defined to occur at the end of a TDD TTI or in the middle of the TDD TTI. In another example, for switching types with two opposite regions, one opposite region may be defined to occur at the end of a TDD TTI and the other may be defined to occur in the middle of the TDD TTI. One of ordinary skill in the art would recognize many variations for defining different switching types corresponding to different frame structure configurations and arranging opposite regions within a TDD TTI. It will be appreciated that for switching types with an opposite data region and an opposite feedback region, the two regions may be located at adjacent time periods within a TDD TTI, or at the same time period but over different frequency resources, to reduce the number of downlink and uplink transitions, and thus the number of guard periods. As well, although the embodiments of the present disclosure illustrate TDD TTIs with an opposite data region followed by an opposite feedback region, it will be appreciated that these regions may be defined in any order. One of ordinary skill in the art would also recognize that, although not illustrated in FIG. 6, a guard period would be included in a TDD TTI at any transition between downlink and uplink transmissions.

FIGS. 7-8 illustrate tables 700 and 800 for representing frame structure configurations and their corresponding switching types according to embodiments of the present disclosure. In one embodiment, one table is defined for each frame structure configuration, representing a set of corresponding switching types. As shown in FIG. 7, a table 710 is used to represent four switching types defined corresponding to frame structure configuration 1. Table 720 and table 730 include seven and four switching types corresponding to frame structure configuration 2 and frame structure configuration 3, respectively. As can be seen from FIG. 7, different frame structure configurations may have different sets of switching types defined. For example, each of the three frame structure configurations has a Type 2 switching type, which, however, may be defined differently from each other. In another embodiment, one table is used to represent switching types for multiple frame structure configurations. As shown in FIG. 8, table 800 includes seven switching types defined consistently for all three frame structure configurations 1-3. Whether a frame structure configuration has a switching type defined is shown by a mark in the corresponding cell of the table 800, e.g., checked or marked as "not available" (N/A). One of ordinary skill in the art would recognize many variations and alternatives for representing different frame structure configurations and corresponding switching types.

In some embodiments, a TDD frame may carry OFDM or filtered OFDM (f-OFDM) signals communicated in TTIs in accordance with different frame structure configurations and switching types. An f-OFDM signal may be generated by applying a pulse shaping digital filter to an OFDM signal. TTIs may be assigned different frame structure configurations with different switching types for communications over different OFDM frequency sub-bands. A network controller may be used to assign frame structure configurations to the TTIs over different frequency sub-bands and select switching types for the TTIs. The network controller may send an indication to a base station, indicating that the base station communicates OFDM signals in the TTIs in accordance with the assigned frame structure configurations and selected switching types. The base station may also signal the frame structure configurations and switching types to UEs for communications in the TTIs.

Figure 9:
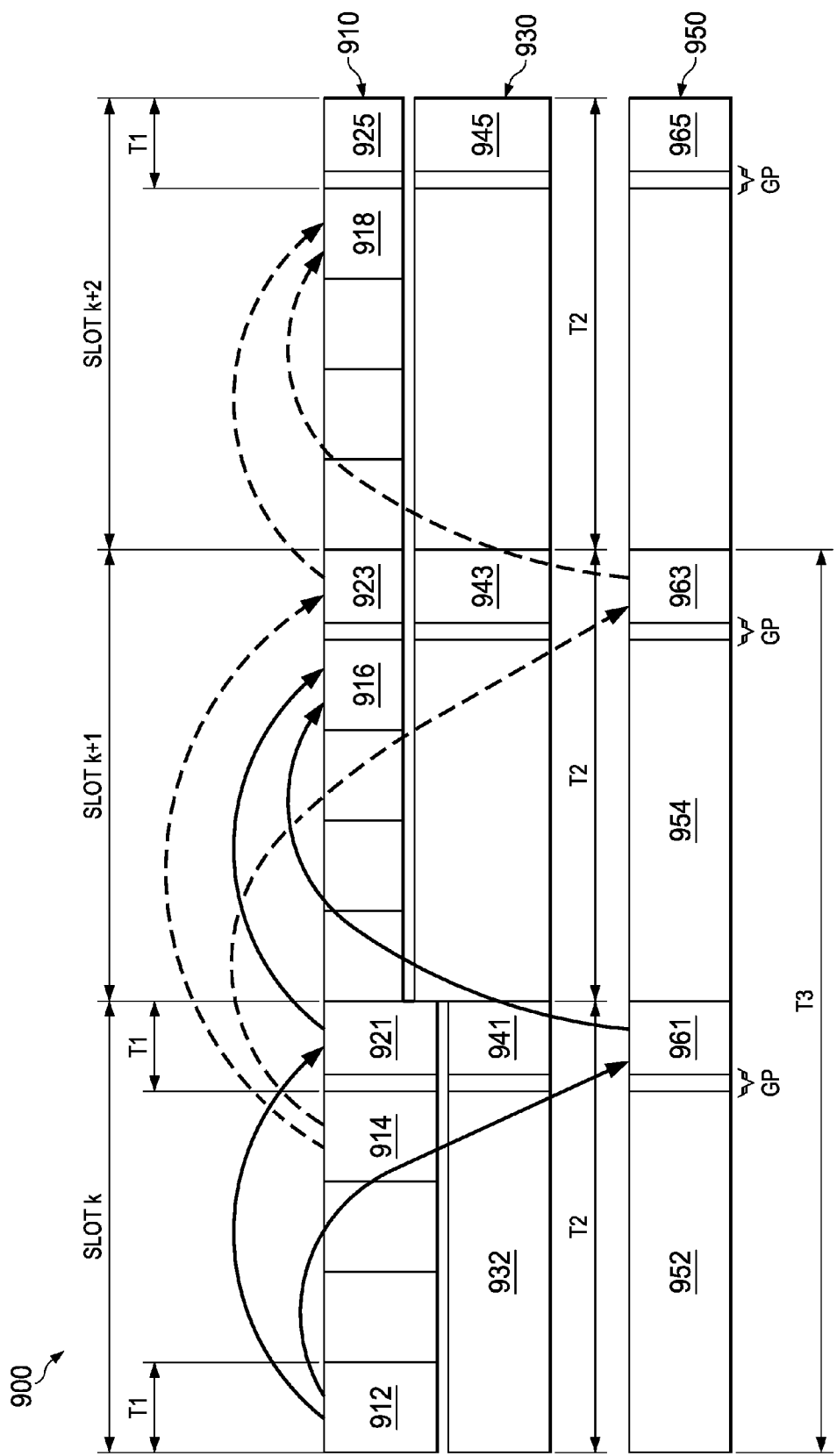
FIG. 9 is a diagram of an embodiment TDD frame.

FIG. 9 is a diagram of an embodiment TDD frame 900, where TTIs of different lengths are used to communicate OFDM signals. As shown, TTIs 912, 914, 916 and 918 are assigned to a frequency sub-band 910, and have a TTI length of T1. TTIs, such as TTI 932, assigned to a sub-band 930 have a TTI length of T2. TTIs assigned to a sub-band 950 have a TTI length of T3. The lengths of TTIs may be integer multiples of a pre-defined minimum TTI length. For example, when a pre-defined minimum TTI length is 0.1 ms, the T1 may be 0.2 ms, T2 may be 0.5 ms, and T3 may be 1 ms. As another example, when a pre-defined minimum TTI length is 0.125 ms, T1 may be 0.25 ms, T2 may be 0.5 ms, and T3 may be 1 ms. The TDD frame 900 is divided into slots in the time domain, such as the slots k, k+1 and k+2. As shown, a TTI in the sub-band 930 spans one slot, and a TTI in the sub-band 950 spans two slots. In one embodiment, the bandwidth of a frequency sub-band may change over time. For example, bandwidths of the sub-band 910 are different during the slot k and slot k+1. Similarly, bandwidths of the sub-band 930 are different during the slot k and slot k+1. For simplicity of description, each TTI in the TDD frame 900 of this example is a downlink TTI for downlink transmissions, and may include a portion for communicating downlink control information and a portion for communicating data. One of ordinary skill in the art would recognize that the TDD frame 900 may include TTIs for downlink transmissions, uplink transmissions, or both.

In some embodiments, one or more configurable time intervals for uplink transmissions may be included in the TDD frame 900 to accommodate different uplink transmission requirements, such as low latency requirements. These configurable time intervals may also provide dynamics for flexible resource allocation and spectrum utilization for uplink transmissions. As shown in FIG. 900, the TDD frame 900 includes configurable time intervals 921, 923, 925, 941, 943, 945, 961, 963 and 965 at the end of each slot over frequency sub-bands 910, 930 and 950, which are aligned across the frequency sub-bands in the time domain. The configurable time intervals 921, 923 and 925 are uplink TTIs. The configurable time intervals 941, 943, 945, 961, 963 and 965 may be opposite data and/or feedback regions within TDD TTIs, as described above with respect to FIGS. 2-3. Specifically, the configurable time interval 961 splits a TTI in the sub-band 950 into two time intervals 952 and 954. Locations and duration of the configurable time intervals may be pre-defined. In one embodiment, the lengths of the configurable time intervals may be integer multiples of a length of a pre-defined minimum TTI, so that these configurable time intervals may be aligned across the sub-bands in the time domain. These configurable time intervals may be used for communicating uplink data or uplink feedback information, such as uplink ACK/NACK messages. For example, the configurable time interval 921 in the sub-band 910 may be used to transmit an uplink ACK/NACK message corresponding to the data transmitted in the TTI 912. Retransmission of the data may be performed in a later TTI, e.g., the TTI 916 in the sub-band 910. The uplink ACK/NACK message corresponding to the data transmitted in the TTI 912 may also be transmitted in the configurable time interval 961 in the sub-band 950. In another example, an uplink ACK/NACK message corresponding to data communicated in the TTI 914 may be transmitted in the configurable time interval 923 in the sub-band 910. The data communicated in the TTI 914 may be retransmitted in the TTI 918 in the sub-band 910. The configurable time interval 963 in the sub-band 950 may also be used to transmit the uplink ACK/NACK message corresponding to the data communicated in the TTI 914. A configurable time interval in one sub-band may be used to transmit an uplink ACK/NACK message corresponding to a downlink data transmitted in a downlink TTI in any sub-band of the TDD frame 900. The configurable time intervals in this example may be used to reduce HARQ round trip time (RTT) delay. As described above, a GP (not shown) is included whenever there is transition between a downlink transmission and an uplink transmission. GPs are aligned across all frequency sub-bands in the time domain.

Figure 10:
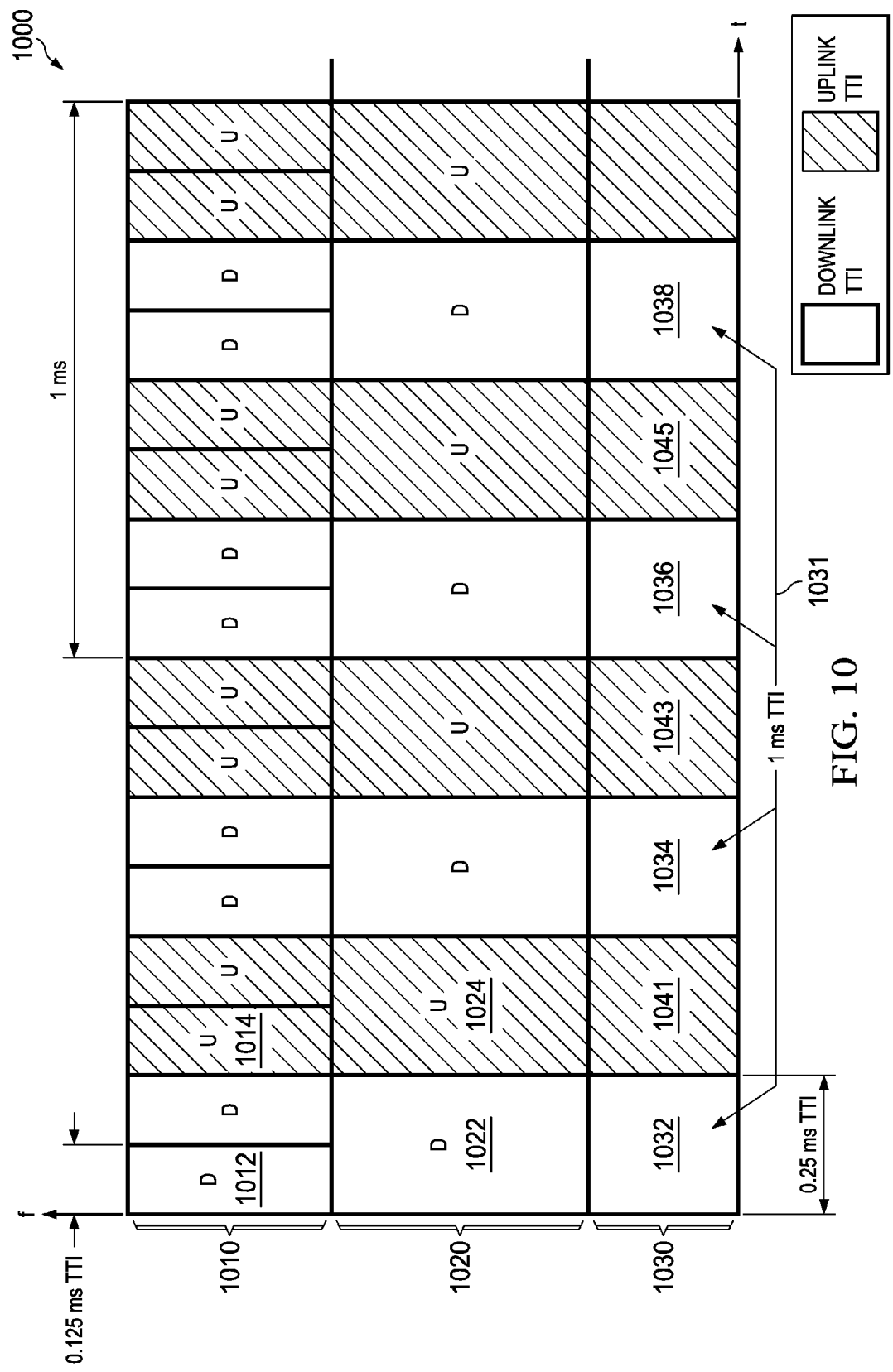
FIG. 10 is a diagram of another embodiment TDD frame.

FIG. 10 is a diagram of another embodiment TDD frame 1000, which carries f-OFDM signals communicated in TTIs over different frequency sub-bands. FIG. 10 illustrates three frequency sub-bands 1010, 1020 and 1030. Each TTI may be a downlink or an uplink TTI. In one embodiment, a pattern of downlink and uplink TTIs of a frame, which may be referred to as a downlink/uplink TTI configuration, may be pre-defined for the TDD frame 1000. A downlink/uplink TTI configuration specifies a downlink:uplink TTI traffic ratio. The downlink:uplink TTI traffic ratio may be determined based on traffic types, number of UEs served in a network, latency requirements, etc. In this example, the downlink:uplink TTI ratio is 1:1. In one embodiment, TTIs in different frequency sub-bands may have different lengths. In this example, TTIs in sub-band 1010 have a TTI length of 0.125 ms, such as downlink TTI 1012 and uplink TTI 1014. TTIs in sub-band 1020 have a TTI length of 0.25 ms, such as downlink TTI 1022 and uplink TTI 1024. TTIs in sub-band 1030 have a TTI length of 1 ms, such as downlink TTI 1031. As shown, the downlink TTI 1031 in sub-band 1030 is split into four regions 1032, 1034, 1036 and 1038 by the insertion of uplink TTIs 1041, 1043 and 1045. Each of the four regions 1032, 1034, 1036 and 1038 has a duration of 0.25 ms. The uplink TTIs 1041, 1043 and 1045 inserted in the downlink TTI may be used for communicating data or ACK/NACK feedback messages to meet latency requirements. Although the downlink TTI is split into four regions 1032, 1034, 1036 and 1038, the four regions are not separate TTIs with their own control, data and pilot channels; instead, they share the control and pilots channels, and transmission and receiving processing of the four regions are performed over the entire TTI length, i.e., 1 ms. GPs, e.g., OFDM symbols, are inserted (not shown) to facilitate switching between downlink and uplink transmissions, and are aligned in the time domain across all the frequency sub-bands. FIG.

10 illustrates that no TTI includes any opposite feedback or data regions as illustrated above in FIGS. 2-5.

Figure 11:
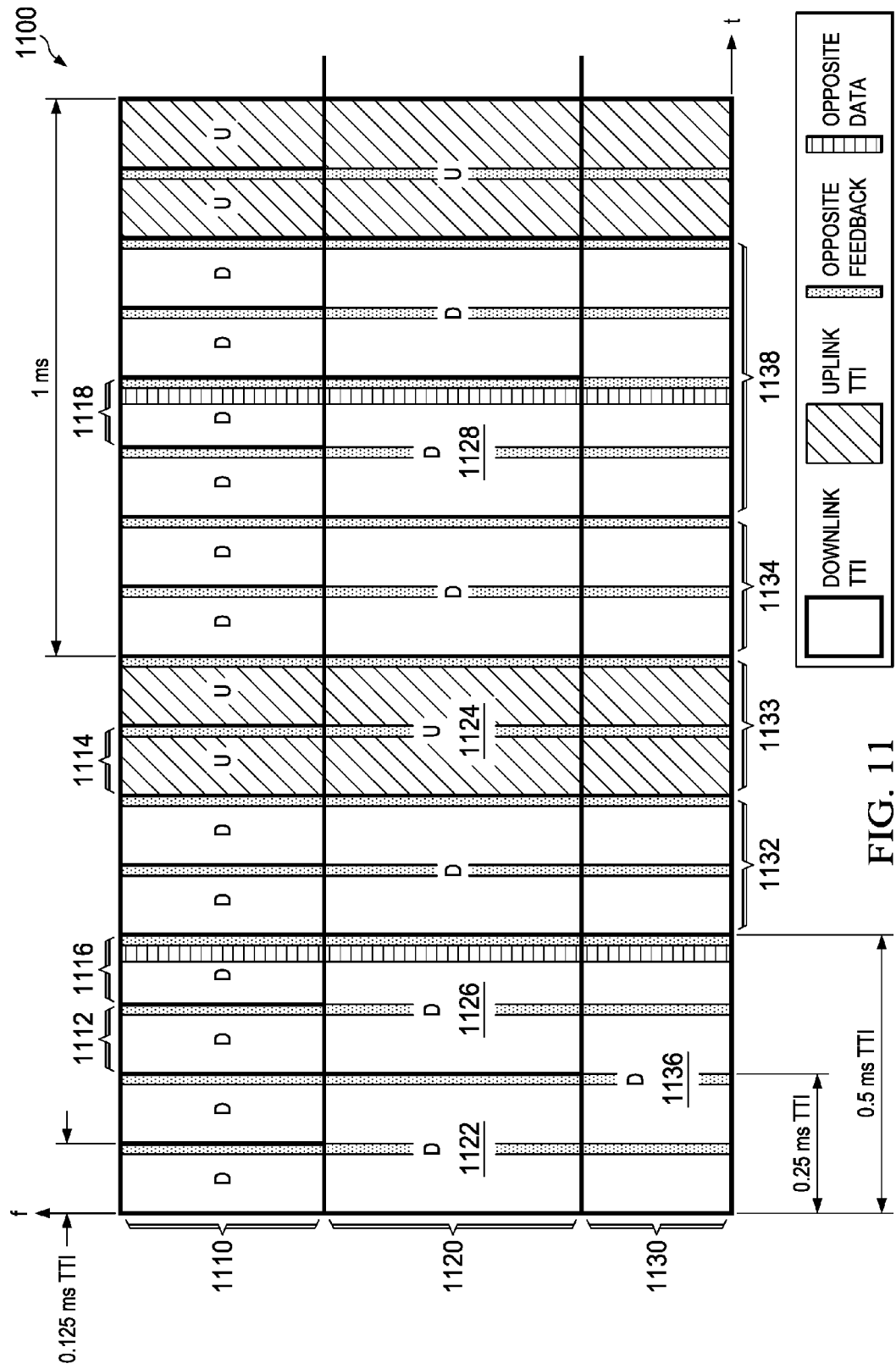
FIG. 11 is a diagram of yet another embodiment TDD frame.

FIG. 11 is a diagram of another embodiment TDD frame 1100, which carries f-OFDM signals communicated in TTIs over different frequency sub-bands 1110, 1120 and 1130. The TDD frame 1100 has a downlink:uplink TTI ratio of 6:2. TTIs in different frequency sub-bands in this example also have different lengths. TTIs in frequency sub-band 1110 have a TTI length of 0.125 ms. TTIs in frequency sub-band 1120 have a TTI length of 0.25 ms. TTIs in frequency sub-band 1130 have a TTI length of 0.5 ms. Regions 1132 and 1134, split by an uplink TTI 1133, form one TTI in frequency sub-band 1130. In one embodiment, the TDD frame 1100 may include TTIs of different switching types. For example, TTIs 1112 and 1114 in frequency sub-band 1110 include one opposite feedback region at the end of each corresponding TTI. TTIs 1116 and 1118 include a pair of opposite regions at the end of each corresponding TTI. TTIs 1122 and 1124 in frequency sub-band 1120 include one opposite feedback region located in the middle and one opposite feedback region at the end of each corresponding TTI. TTIs 1126 and 1128 include one opposite feedback region in the middle and a pair of opposite regions at the end. TTIs 1136 and 1138 in frequency sub-band 1130 include four opposite feedback regions and one opposite data region within a corresponding TTI. The TTI formed by regions 1132 and 1134 includes four opposite feedback regions. Uplink TTI 1133 includes one opposite feedback region located in the middle and another opposite feedback region located at the end. GPs are inserted (not shown) whenever there is switching between downlink and uplink transmissions, and are aligned in the time domain across multiple frequency sub-bands. Consequently, the opposite feedback regions and the opposite data regions in TTIs of the TDD frame 1100 are also aligned across the frequency sub-bands in the time domain. Although FIG. 11 illustrates that a pair of opposite regions in a TTI, such as TTI 1126, are arranged to be adjacent to each other in the time domain, the pair of opposite regions may alternatively be assigned to different frequency resources during the same time period.

Figure 12:
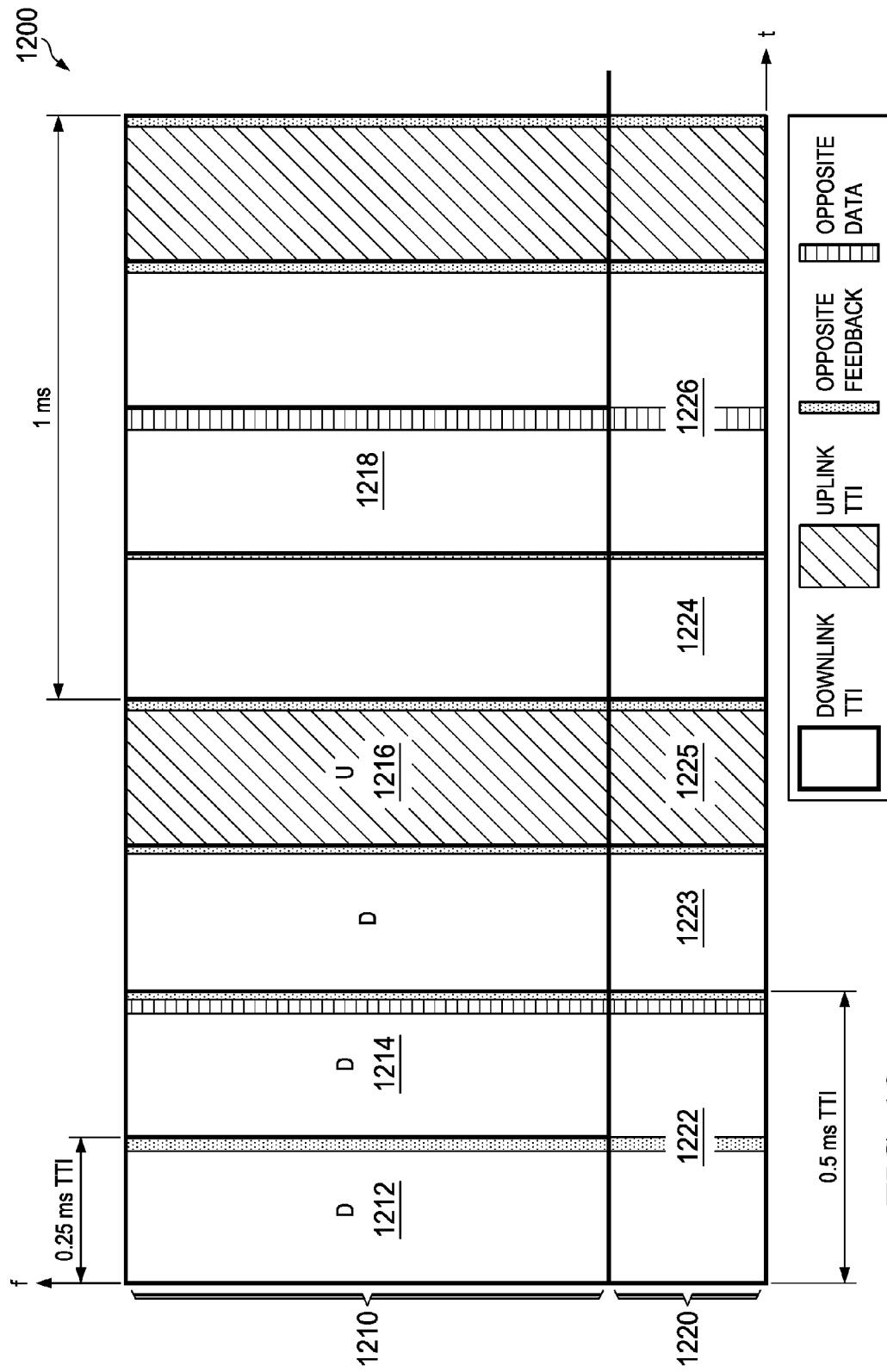
FIG. 12 is a diagram of yet another embodiment TDD frame.

FIG. 12 is a diagram of another embodiment TDD frame 1200, which carries f-OFDM signals communicated in TTIs over different frequency sub-bands 1210 and 1220. The TDD frame 1200 has a downlink:uplink TTI ratio of 6:2. TTIs in frequency sub-band 1210 have a TTI length 0.25 ms, and TTIs in frequency sub-band 1220 have a TTI length 0.5 ms. Regions 1223 and 1224, split by an uplink TTI 1225, form one TTI in frequency sub-band 1220. FIG. 12 also illustrates that TTIs in the TDD frame 1200 may have different switching types. For example, TTIs 1212 and 1216 have one opposite feedback region at the end of each corresponding TTI, TTI 1214 has a pair of opposite regions located at the end, and TTI 1218 has one opposite data region at the end. In another example, TTI 1222 contains one opposite feedback region in the middle and a pair of opposite regions at the end, the TTI formed by the regions 1223 and 1224 contains two opposite feedback regions located in the middle and at the end of the TTI, TTI 1225 has one opposite feedback region at the end, and TTI 1226 has one opposite data region in the middle and one opposite feedback region at the end. In one embodiment, durations of the opposite data regions or opposite feedback regions may be different for different TTIs or within the same TTI. For example, the opposite data regions in TTIs 1214 and 1218 have different durations, the opposite feedback regions in TTIs 1212 and 1214 have different durations, and the opposite feedback regions in regions 1223 and 1224, which form one TTI, also have different durations. Similarly, GPs are inserted (not shown) whenever there is switching between downlink and uplink transmissions, and are aligned in the time domain across all the frequency sub-bands.

Figure 13:
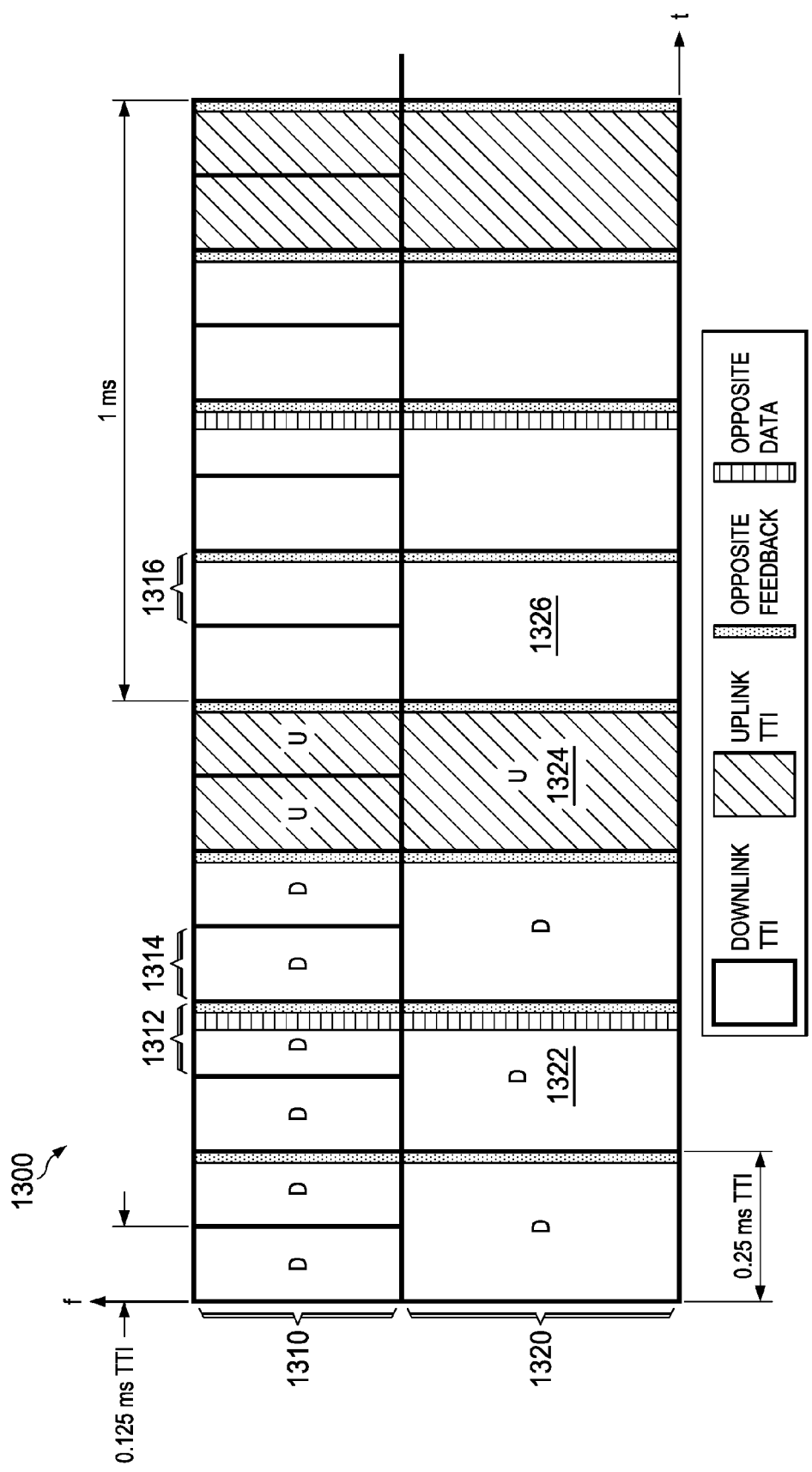
FIG. 13 is a diagram of yet another embodiment TDD frame.

FIG. 13 illustrates a diagram of a TDD frame 1300, where f-OFDM signals are communicated in TTIs over different frequency sub-bands with different subcarrier spacings. TDD frame 1300 shows frequency sub-bands 1310 and 1320 with subcarrier spacings of 30 kHz and 60 kHz. The TDD frame 1300 has a downlink:uplink TTI ratio of 6:2, and TTIs in different f-OFDM frequency sub-bands have different TTI lengths. For example, TTIs in frequency sub-band 1310 have a length of 0.125 ms, and TTIs in frequency sub-band 1320 have a length of 0.25 ms. TTIs in the TDD frame 1300 may also have different switching types. For example, TTIs 1312 and 1322 have a pair of opposite regions at the end, TTI 1314 does not have any opposite region, and TTIs 1316, 1324 and 1326 have one opposite feedback region at the end.

Figure 14:
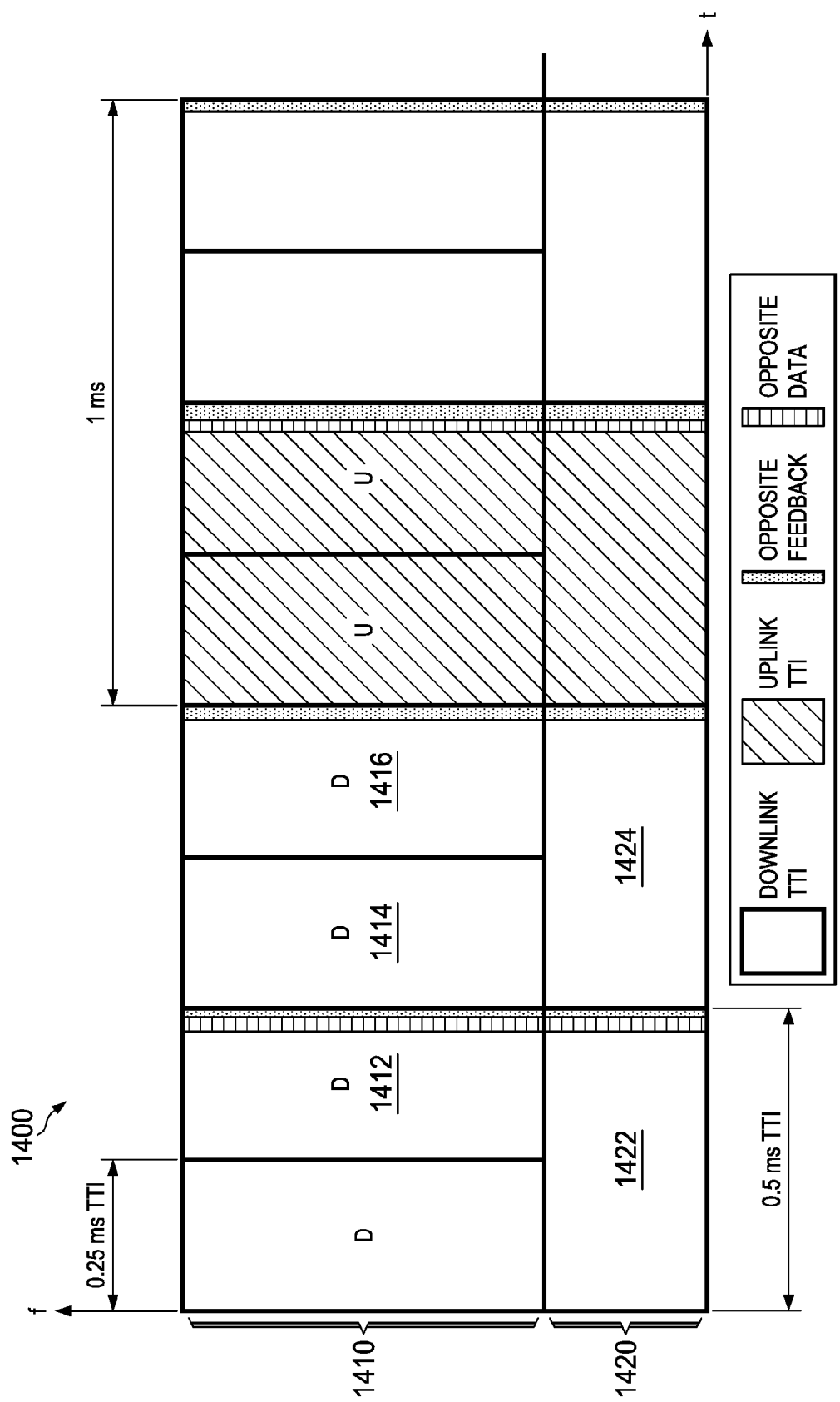
FIG. 14 is a diagram of yet another embodiment TDD frame.

FIG. 14 illustrates a diagram of another TDD frame 1400, where f-OFDM signals are communicated in TTIs over different frequency sub-bands with different subcarrier spacings. The TDD frame 1400 shows frequency sub-bands 1410 and 1420 with subcarrier spacings of 15 kHz and 30 kHz, and the TDD frame 1400 has a downlink:uplink TTI ratio of 6:2. TTIs in the TDD frame 1400 include TTIs having different lengths and different switching types. TTIs in frequency sub-band 1410 have a length of 0.25 ms, and TTIs in frequency sub-bands 1420 have a length of 0.5 ms. TTIs 1412 and 1422 have a pair of opposite regions at the end. TTI 1414 does not have any opposite region. TTIs 1416 and 1424 have on opposite feedback region at the end. As shown, opposite feedback regions and opposite data regions included in TTIs are aligned across the frequency sub-bands in the time domain. Similarly, GPs are inserted (not shown) whenever there is switching between downlink and uplink transmissions, and are aligned in the time domain across all the frequency sub-bands. One of ordinary skill in the art would recognize many variations and modifications for communicating OFDM signals in TDD frames in accordance with different frame structure configurations and switching type, where TTIs, opposite data regions and opposite feedback regions may be arranged differently than what are illustrated in FIGS. 9-14.

Figure 15:
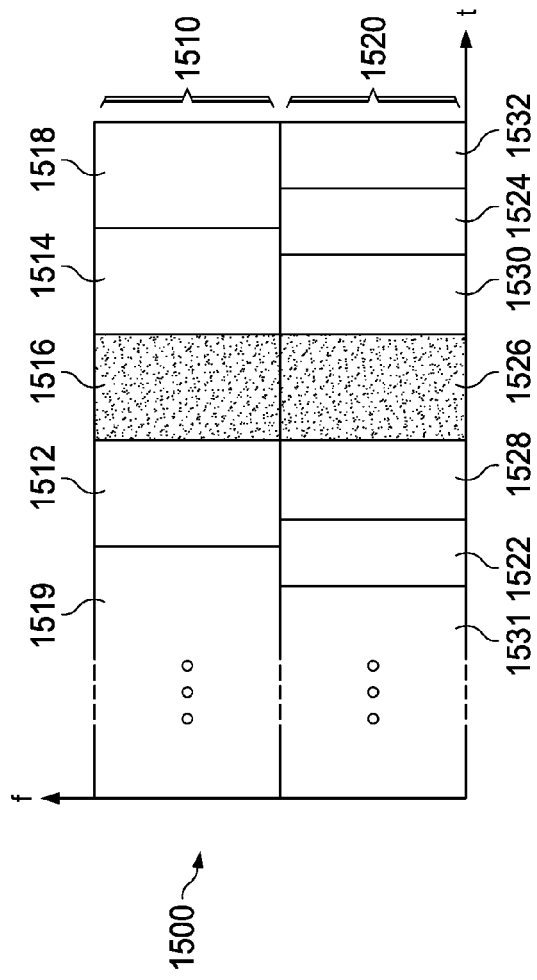
FIG. 15 is a diagram of a TDD frame using special OFDM symbols to align GPs across frequency sub-bands.

As described above, different TTIs in a TDD frame may be assigned to different frame structure configurations and have different switching types. GPs may be included wherever there is a transition between downlink and uplink transmissions. The GPs included in the TDD frame need to be aligned in the time domain across different frequency sub-bands in order to prevent or reduce interference. In some embodiments, the alignment of GPs may be provided by virtue of frame structure configurations having symbol durations that are integer multiples of each other. In some embodiments, alignment of GPs may also be implemented using special OFDM symbols having different durations than that specified by frame structure configurations. In one example, this may be implemented by varying the CP lengths of the special OFDM symbols. FIG. 15 is a diagram of a TDD frame 1500 where special OFDM symbols are used to align GPs across frequency sub-bands. Details of TTIs and opposite feedback and data regions within each TTI are not shown, but it can be appreciated that with different combinations of these portions and different signal transmissions, the end of signal transmissions in TTIs of each frequency sub-band may not be aligned in the time domain. The TDD frame 1500 carries f-OFDM signals communicated over two different frequency sub-bands 1510 and 1520 with different frame structure configurations. As described above, different frame structure configurations specify different sets of frame parameters, including bandwidth, TTI length, OFDM symbol duration, CP length, etc. In this example, OFDM symbol duration (including CP) in the frequency sub-band 1510 is T1, and OFDM symbol duration (including CP) in the frequency sub-band 1520 is T2. FIG. 15 illustrates a region 1519 in the frequency sub-band 1510 which may include multiple OFDM symbols (not shown) with a symbol duration of T1, and OFDM symbols 1512, 1514 and 1518 in the frequency sub-band 1510 with a symbol duration of T1. FIG. 15 also illustrates a region 1531 in the frequency sub-band 1520 which may include multiple OFDM symbols (not shown) with a symbol duration of T2, and OFDM symbols 1522, 1524 and 1532 in the frequency sub-band 1520 with a duration of T2. GPs 1516 and 1526 are inserted to separate downlink and uplink transmissions. In one embodiment, special OFDM symbols 1528 and 1530 having different durations than T2 are placed before and after the GP 1526 in order to align the GP 1526 with the GP 1516. The special OFDM symbols 1528 and 1530 may also have different symbol durations than each other, e.g., by having different CP lengths. Depending on symbol durations of different frame structure configurations, one or more special OFDM symbols may be placed before, after, or before and after one or more GPs so that GPs are aligned across frequency sub-bands in the time domain.

Figure 16:
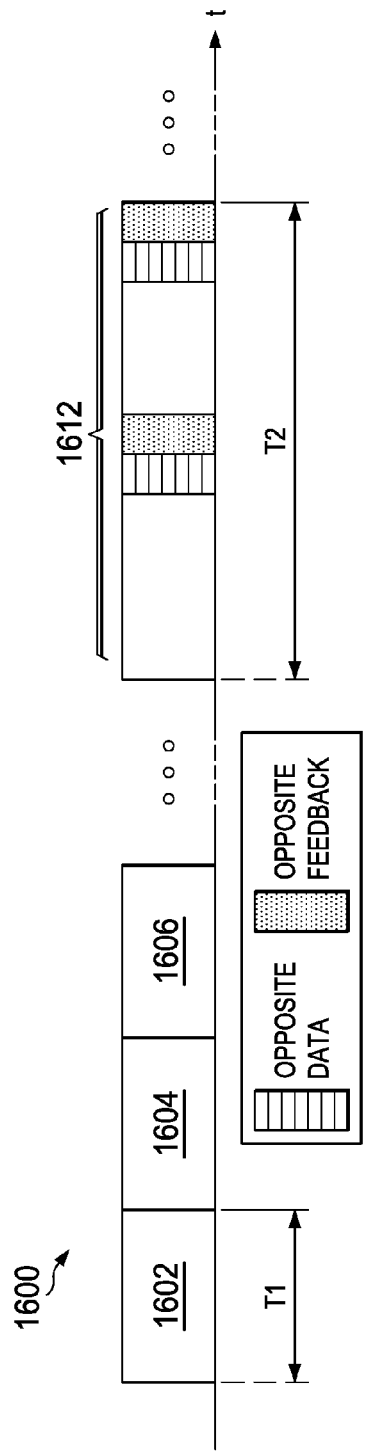
FIG. 16 is a diagram of yet another embodiment TDD frame.

In some embodiments, TTIs assigned to the same frequency resource may be assigned different frame structure configurations and switching types. FIG. 16 is a diagram of an embodiment TDD frame 1600 including TTIs of different frame structure configurations and switching types. TTIs 1602, 1604 and 1606 are assigned the same frame structure configuration, with the same TTI length of T1. These TTIs do not contain any opposite ACK/NACK or data region. TTI 1612 is used to communicate signals at a later time than the TTIs 1602, 1604 and 1606. As shown, TTI 1612 is assigned a different frame structure configuration, with a TTI length of T2 and containing two pair of opposite regions. In one embodiment, information about a frame structure configuration and a switching type defined for one or more TTIs may be broadcast by a wireless network before transmissions in such TTIs begin. FIG. 16 shows two different frame structure configurations merely for illustrative purpose. One of ordinary skill in the art would recognize many variations and modifications to use different frame structure configurations and switching types for communications in TTIs over the same frequency resource.

As described above, TTIs may be configured to have different frame structure configurations and TTI switching types, and used to communicate signals over different frequency sub-bands. Configuration information of a TTI may be pre-defined or defined dynamically, and signaled to UEs. The configuration information of a TTI may include one or more of frame structure configurations, and TTI switching types, frequency sub-bands, and downlink/uplink TTI configuration, etc. Depending on the flexibility and types and configurations of frames used in a wireless network, it will be appreciated that different schemes may be defined to limit the number of bits required to signal such configuration information. The signaling may be transmitted through broadcast, multicast or unicast semi-statically or statically. In one embodiment, the configuration information is broadcast semi-statically to UEs. In another embodiment, the configuration information is transmitted to target UEs. In another embodiment, the configuration information may be signaled through a control channel with other signaling overhead messages. Depending on the types of devices and traffic being supported in a wireless network and also the load in the wireless network, TDD frames may be adaptively configured to flexibly accommodate data transmissions in TTIs using different frame structure configurations, switching types, and frequency sub-bands. The determination of how downlink and uplink transmissions are communicated in TTIs may be performed by a base station or another node or entity in a wireless network, such as a scheduling entity or a central controller associated with multiple base stations.

Figure 17:
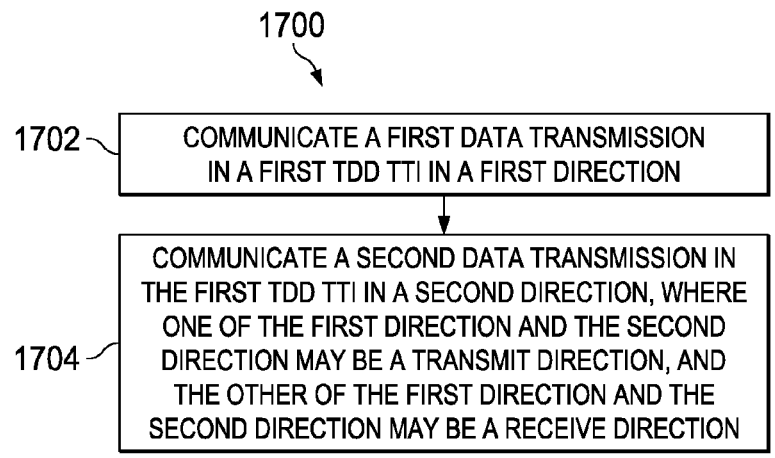
FIG. 17 is a diagram of a method for wireless communications.

FIG. 17 is a flowchart of an embodiment method 1700 for wireless communications. At step 1702, a device communicates a first data transmission in a first TDD TTI of a radio frame in a first direction, and at step 1704, the device communicates a second data transmission in the first TDD TTI in a second direction. One of the first direction and the second direction may be a transmit direction, and the other of the first direction and the second direction may be a receive direction. In one embodiment, the first direction is an uplink direction and the second direction is a downlink direction, or vice versa. The first TDD TTI may be configured with a first frame structure configuration. The first TDD TTI may include a GP separating the first and the second data transmission. In one embodiment, the first data transmission and the second data transmission are communicated over different frequency resources. In another embodiment, the first data transmission and the second data transmission are communicated over the same frequency sub-band. The first data transmission or the second data transmission may also be communicated grant-free. For example, the first data transmission or the second data transmission is communicated in accordance with a contention-based mechanism. The device may be a base station or a user equipment. The device may further signal, to a user equipment, at least the first frame structure configuration or configuration information of the first TDD TTI.

In some embodiments, the first TDD TTI is a downlink TTI including an uplink transmission opportunity. The uplink transmission opportunity may be viewed as an opposite data region in the downlink TTI. The downlink TTI may carry control information specifying a location, a duration, or a frequency resource of the uplink transmission opportunity in the downlink TTI. The location, a duration, or a frequency resource of the uplink transmission opportunity may be pre-defined and defined when needed. In one embodiment, the device may further communicate an uplink ACK/NAK message, which confirms whether a previous downlink data transmission communicated was successfully received. The ACK/NAK message may be communicated with an uplink data transmission over different frequency resources during the same time period or over the same frequency resources during different time periods. The uplink data transmission may be one of the first data transmission or the second data transmission.

In some embodiments, the first TDD TTI is an uplink TTI including a downlink transmission opportunity. The uplink TTI may carry control information specifying a location, a duration, or a frequency resource of the downlink transmission opportunity in the uplink TTI. The downlink transmission opportunity may be viewed as an opposite data region in the uplink TTI. The location, a duration, or a frequency resource of the downlink transmission opportunity may be pre-defined and defined when needed. In one embodiment, the device may further communicate a downlink ACK/NAK message, which confirms whether a previous uplink data transmission communicated was successfully received. The ACK/NAK message may be communicated with a downlink data transmission over different frequency resources during the same time period or over the same frequency resources during different time periods. The downlink data transmission may be one of the first data transmission or the second data transmission.

In one embodiment, the device may further communicate a third data transmission in a second TDD TTI of the radio frame, where the TDD TTI is configured with a second frame structure configuration different than the first frame structure configuration. The third data transmission may be communicated in a transmit direction or a receive direction. The first TDD TTI and the second TDD TTI may be assigned to different OFDM frequency sub-bands or the same OFDM frequency sub-band. In one example, the first TDD TTI and the second TDD TTI have different TTI lengths. In another example, the first and the second data transmissions in the first TDD TTI and the third data transmission in second TDD TTI are communicated in accordance with different subcarrier spacings, or OFDM symbols of different lengths. In another embodiment, the device may further communicate a fourth data transmission in the second TDD TTI. The third data transmission may be communicated in a transmit direction and the fourth data transmission may be communicated in a receive direction, or vice versa. In one embodiment, the second TDD TTI may be a downlink TTI including an uplink transmission opportunity, or may be an uplink TTI including a downlink transmission opportunity. In yet another embodiment, the device may further communicate an ACK/NAK message in the second TDD TTI, where the third data transmission and the ACK/NAK message travel in opposite transmission directions than one another.

In some embodiments, a network controller may assign a first frame structure configuration for communicating in a first TDD TTI in a first direction over a first frequency sub-band. The first frame structure configuration corresponds to a first set of frame parameters. The first set of frame parameters comprises a subcarrier spacing, a TTI length, an OFDM symbol duration, or a cyclic prefix length. The network controller may be located at a base station, a higher layer network node, or any other applicable network element in a wireless network. The network controller may also select a switching type for the first TDD TTI. The switching type indicates whether or not the first TDD TTI includes at least one transmission opportunity for communicating in a second direction. One of the first direction and the second direction may be a transmit direction, and the other of the first direction and the second direction may be a receive direction. The network controller may then send an indication, e.g., to a base station, indicating communication of OFDM signals in the first TDD TTI in accordance with the first set of frame parameters and the selected switching type. The first frame structure configuration may be assigned in accordance with a traffic type of data communicated in the first TDD TTI, the number of user equipments being served by a base station, a latency requirement, or a request from a UE. The switching type may be selected in accordance with the assigned first frame structure configuration, a latency requirement, or a request from a user equipment. The network controller may also assign a second frame structure configuration for communicating in a second TDD TTI over a frequency sub-band that is same as or different than the first frequency sub-band. The second frame structure configuration corresponds to a second set of frame parameters different than the first set of frame parameters.

Figure 18:
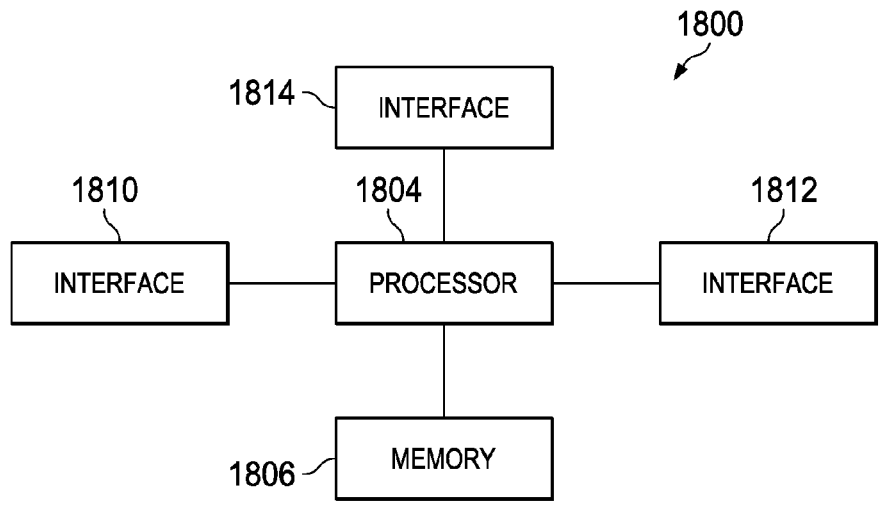
FIG. 18 is a block diagram of an embodiment processing system.

FIG. 18 is a block diagram of an embodiment processing system 1800 for performing methods described herein, which may be installed in a host device. As shown, the processing system 1800 includes a processor 1804, a memory 1806, and interfaces 1810-1814, which may (or may not) be arranged as shown in FIG. 18. The processor 1804 may be any component or collection of components adapted to perform computations and/or other processing related tasks, and the memory 1806 may be any component or collection of components adapted to store programming and/or instructions for execution by the processor 1804. In an embodiment, the memory 1806 includes a non-transitory computer readable medium. The interfaces 1810, 1812, 1814 may be any component or collection of components that allow the processing system 1800 to communicate with other devices/components and/or a user. For example, one or more of the interfaces 1810, 1812, 1814 may be adapted to communicate data, control, or management messages from the processor 1804 to applications installed on the host device and/or a remote device. As another example, one or more of the interfaces 1810, 1812, 1814 may be adapted to allow a user or user device (e.g., personal computer (PC), etc.) to interact/communicate with the processing system 1800. The processing system 1800 may include additional components not depicted in FIG. 18, such as long term storage (e.g., non-volatile memory, etc.).

In some embodiments, the processing system 1800 is included in a network device that is accessing, or part otherwise of, a telecommunications network. In one example, the processing system 1800 is in a network-side device in a wireless or wireline telecommunications network, such as a base station, a relay station, a scheduler, a controller, a gateway, a router, an applications server, or any other device in the telecommunications network. In other embodiments, the processing system 1800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 19:
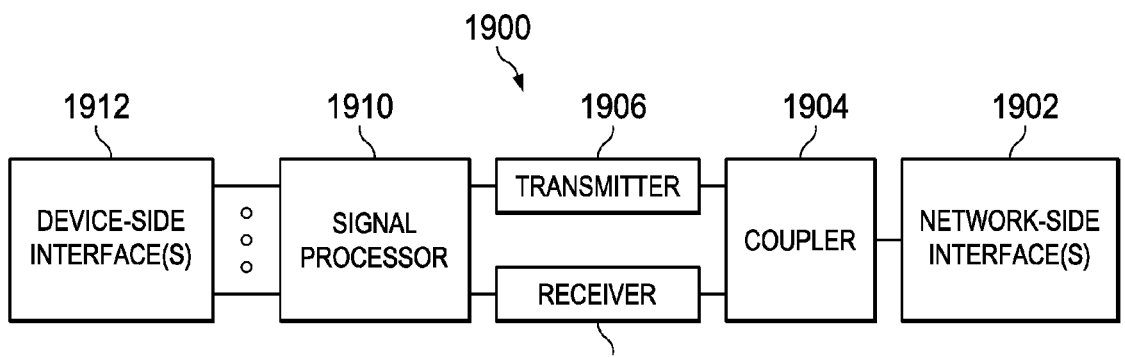
FIG. 19 is a block diagram of a transceiver.

In some embodiments, one or more of the interfaces 1810, 1812, 1814 connects the processing system 1800 to a transceiver adapted to transmit and receive signaling over the telecommunications network. FIG. 19 is a block diagram of a transceiver 1900 adapted to transmit and receive signaling over a telecommunications network. The transceiver 1900 may be installed in a host device. As shown, the transceiver 1900 comprises a network-side interface 1902, a coupler 1904, a transmitter 1906, a receiver 1908, a signal processor 1910, and device-side interface(s) 1912. The network-side interface 1902 may include any component or collection of components adapted to transmit or receive signaling over a wireless or wireline telecommunications network. The coupler 1904 may include any component or collection of components adapted to facilitate bi-directional communication over the network-side interface 1902. The transmitter 1906 may include any component or collection of components (e.g., up-converter, power amplifier, etc.) adapted to convert a baseband signal into a modulated carrier signal suitable for transmission over the network-side interface 1902. The receiver 1908 may include any component or collection of components (e.g., down-converter, low noise amplifier, etc.) adapted to convert a carrier signal received over the network-side interface 1902 into a baseband signal. The signal processor 1910 may include any component or collection of components adapted to convert a baseband signal into a data signal suitable for communication over the device-side interface(s) 1912, or vice-versa. The device-side interface(s) 1912 may include any component or collection of components adapted to communicate data-signals between the signal processor 1910 and components within the host device (e.g., the processing system 1800, local area network (LAN) ports, etc.).

The transceiver 1900 may transmit and receive signaling over any type of communications medium. In some embodiments, the transceiver 1900 transmits and receives signaling over a wireless medium. For example, the transceiver 1900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1902 comprises one or more antenna/radiating elements. For example, the network-side interface 1902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for wireless communications, comprising:
   communicating, by a device, a first uplink transmission and a first downlink transmission in a first time division duplexing (TDD) transmission time interval (TTI) in a first TDD frame in a first sub-band of a carrier, the carrier comprising a plurality of sub-bands,
   wherein the plurality of sub-bands comprises a second sub-band associated with a second TDD frame comprising a second TDD TTI, wherein the second TDD TTI comprises a second uplink transmission and a second downlink transmission, wherein a length of the second TDD TTI is different from a length of the first TDD TTI, and wherein the first uplink transmission and the second uplink transmission align in a time domain across the first sub-band and the second sub-band, and/or the first downlink transmission and the second downlink transmission align in the time domain across the first sub-band and the second sub-band.

2. The method of claim 1, further comprising signaling, to a user equipment, at least structure configuration of the first TDD frame or the length of the first TDD TTI.

3. The method of claim 1, wherein the device is a base station or a user equipment.

4. The method of claim 1, wherein the first TDD frame further includes a guard period separating the first uplink transmission and the first downlink transmission in the time domain.

5. The method of claim 1, wherein the first uplink transmission or the first downlink transmission is communicated grant-free.

6. The method of claim 5, wherein the first uplink transmission or the first downlink transmission is communicated in accordance with a contention-based mechanism.

7. The method of claim 1, wherein the first uplink transmission comprises an acknowledgement/ negative acknowledgement (ACK/NACK) message traveling in an uplink direction, the ACK/NACK message confirming whether a previous downlink data transmission was successfully received.

8. The method of claim 1, wherein the first uplink transmission comprises an acknowledgement/non-acknowledgement (ACK/NACK) message traveling in a downlink direction, the ACK/NACK message confirming whether a previous uplink data transmission was successfully received.

9. The method of claim 1, wherein the first uplink transmission in the first TDD frame and the second uplink transmission in the second TDD frame are communicated in accordance with different subcarrier spacings, or different cyclic prefix lengths.

10. The method of claim 1, further comprising:
    communicating an acknowledgement/non-acknowledgement (ACK/NACK) message in the second TDD frame.

11. A method for wireless communications, comprising:
    assigning, by a network controller, a first frame structure configuration for communicating in a first time division duplexing (TDD) transmission time interval (TTI) in a first direction over a first sub-band of a carrier, and a second frame structure configuration for communicating in a second TDD TTI in the first direction over a second sub-band of the carrier, a length of the second TDD TTI being different from a length of the first TDD TTI, the first frame structure configuration corresponding to a first set of frame parameters, the second frame structure configuration corresponding to a second set of frame parameters;
    selecting, by the network controller, a switching type indicating that the first TDD TTI includes a first transmission opportunity in a second direction and the second TDD TTI includes a second transmission opportunity in the second direction, wherein one of the first direction and the second direction is an uplink direction, and the other of the first direction and the second direction is a downlink direction, and wherein the first transmission opportunity and the second transmission opportunity align in a time domain across the first sub-band and the second sub-band; and
    sending an indication indicating communication of wireless signals in the first TDD TTI and the second TDD TTI in accordance with the first set of frame parameters, the second set of frame parameters, and the selected switching type.

12. The method of claim 11, wherein the first frame structure configuration is assigned in accordance with a traffic type of data communicated in the first TDD TTI, a number of user equipments being served by a base station, a latency requirement, or a request from a user equipment.

13. The method of claim 11, wherein the switching type is selected in accordance with the first frame structure configuration, a latency requirement, or a request from a user equipment.

14. The method of claim 11, wherein the first set of frame parameters comprises a subcarrier spacing, a length of the first TDD TTI, an OFDM symbol duration, or a cyclic prefix length.

15. The method of claim 11, wherein a length of the first TDD TTI is different from a length of the second TDD TTI.

16. The method of claim 11, the first TDD TTI further includes a guard period separating a transmission in the first direction and the first transmission opportunity in the second direction.

17. The method of claim 16, wherein the transmission in the first direction or the first transmission opportunity in the second direction is communicated grant-free.

18. The method of claim 16, wherein the transmission in the first direction or the first transmission opportunity in the second direction is communicated in accordance with a contention-based mechanism.

19. The method of claim 11, wherein the first transmission opportunity in the second direction in the first TDD TTI includes an acknowledgement/non-acknowledgement (ACK/NACK) message, the ACK/NACK message confirming whether a previous data transmission in the first direction was successfully received.

* * * * *